June 10, 1930.  J. VRBANAC  1,762,850

TIRE BUILDING MACHINE

Filed April 4, 1927

JOHN VRBANAC
INVENTOR

BY.

ATTORNEY

Patented June 10, 1930

1,762,850

UNITED STATES PATENT OFFICE

JOHN VRBANAC, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed April 4, 1927. Serial No. 180,852.

My invention relates to machines for building pneuamtic tire casings and more particularly to an improved roll for applying strips of material to the tire carcass while the latter is supported on a revolving core or former.

The main object of my invention is to provide a roll which will apply the material evenly and without wrinkles over the curved surface of the core. Other and further objects will be apparent from the following specification and claims.

In the accompanying drawings which illustrate one embodiment of my invention,

Figure 1 is a longitudinal section of my improved roll,

Figure 2 is a view showing the manner in which the roll operates and,

Figure 3 is a diagrammatic view showing a roll of the prior art.

In the manufacture of tire casings it is customary to form the tire on a core of substantially tire shape, the carcass material being shaped about the core and certain parts such as chafing strips and side wall rubber applied in strip form, either as a unit or as separate strips, to the sides of the carcass on the core. This has heretofore been accomplished by the use of a roll such as is shown at "a" in Figure 3, the roll being shaped to fit the curvature of the core. This has proved unsatisfactory for the reason that the roll being of varying diameters the circumferential speed varied resulting in a slipping and dragging action over parts of the carcass, producing either wrinkles or an uneven stretch in parts of the material applied.

I find that these objectionable features may be overcome by so constructing the applying roll that the diameter of the roll is substantially uniform or uniformly tapered, but at the same time capable of conforming to the shape of the core.

This is accomplished by using a coiled spring 1 held between end plates 2 and 3 threaded to a bearing 4 which is freely rotatable on a shaft 5. The bearing member 4 is held in position on its shaft in any suitable manner as by shoulder 6 formed on the shaft and nut 7 and washer 8. The ends of the spring 1 may be secured to the plates 2 and 3 by welding or otherwise and in large sized rolls it may be advantageous to weld the first two or three coils of the spring, adjacent the end plates, together.

As shown in Figure 2, when the roll is pressed in operative position against the tire carcass 9, supported on rotatable core 10, for the purpose of applying a strip of material such as is indicated at 11, the spring conforms to the shape of the tire. The distorted roll, however, maintains its diameter and, when the core is set in motion rotates about the phantom center 12—12, the circumferential speed of all parts of the roll being uniform. The strip 11 is therefore smoothly applied with minimum distortion. A further advantage is that the same roll may be used for various shapes and sizes of cores. Whereas it was previously necessary to keep on hand as many rolls as was necessary for maximum production, of a shape corresponding to both shape and size of the various types of tires to be built, the number of different shapes and sizes in many cases being twenty or more, with the roll of my invention three standard sizes are found sufficient for the entire range of shapes and sizes. Furthermore, the prior art rolls were quickly worn out due to the fact that there was substantial friction between parts of the roll and the core, while the roll of my invention lasts indefinitely.

I claim:

1. A roll for applying material to the curved surface of a tire casing comprising, a coiled spring confined between end plates, the end plates and spring being mounted for free rotation.

2. A roll for applying material to the curved surface of a tire casing comprising, spaced end members, means to maintain said members in spaced relation, and a coiled spring of substantially uniform diameter confined between said end members.

3. A roll for applying material to the curved surface of a tire casing comprising a cylindrical bearing member, discs secured to the ends of said member and a coiled spring of substantially uniform diameter confined between the discs to form a distortable roll.

4. A roll for applying material to the curved surface of a tire casing comprising a rotatable bearing member, discs secured to the ends of said member and a coiled spring confined between the discs, the ends of the spring being secured to said discs.

5. A roll for applying material to the curved surface of a tire casing comprising a rotatable bearing member, discs secured to the ends of said member and a coiled spring confined between the discs to form a distortable roll.

6. A roll for applying material to the curved surface of a tire casing comprising a rotatable bearing member, discs secured to the ends of said member and a coiled spring confined between the discs, the ends of the spring being secured to said discs and the coils of the spring immediately adjacent the ends being secured to each other.

In testimony whereof I have signed my name to the above specification.

JOHN VRBANAC.